(12) United States Patent
Lin

(10) Patent No.: US 7,571,830 B2
(45) Date of Patent: Aug. 11, 2009

(54) BEVERAGE SHAKER WITH ICE STRAINER

(76) Inventor: Shin-Shuoh Lin, 27022 Falling Leaf Dr., Laguna Hills, CA (US) 92653

( * ) Notice: Subject to any disclaimer, the term of this patent is extended or adjusted under 35 U.S.C. 154(b) by 590 days.

(21) Appl. No.: 11/089,412

(22) Filed: Mar. 25, 2005

(65) Prior Publication Data

US 2006/0255035 A1     Nov. 16, 2006

(51) Int. Cl.
- B65D 77/00   (2006.01)
- B65D 41/56   (2006.01)
- A47J 41/00   (2006.01)
- A47G 19/22   (2006.01)
- B01F 13/00   (2006.01)
- B67D 5/62    (2006.01)
- B67D 5/58    (2006.01)
- B65D 83/00   (2006.01)

(52) U.S. Cl. .......... 220/212; 220/592.17; 220/718; 220/713; 220/254.8; 206/217; 222/145.5; 222/146.6; 222/189.06; 215/387

(58) Field of Classification Search ........ 220/212, 220/592.17, 256.1, 255, 568, 716, 718, 713, 220/254.1, 254.8; 215/356, 228, 387; 206/219; 222/146.6, 145.5, 189.06; 366/347, 130

See application file for complete search history.

(56) References Cited

U.S. PATENT DOCUMENTS

| | | | | |
|---|---|---|---|---|
| 300,867 | A | * | 6/1884 | Hauck ................... 220/568 |
| 2,433,248 | A | * | 12/1947 | Sweier, Jr. ............... 366/147 |
| 4,818,114 | A | | 4/1989 | Ghavi |
| 4,872,764 | A | | 10/1989 | McClean |
| 5,419,429 | A | * | 5/1995 | Zimmerman et al. ........ 206/222 |
| 5,547,275 | A | * | 8/1996 | Lillelund et al. ........... 366/130 |
| 5,911,504 | A | * | 6/1999 | Schindlegger, Jr. ......... 366/197 |
| 6,170,693 | B1 | * | 1/2001 | Goto ................... 220/592.17 |
| 6,299,037 | B1 | | 10/2001 | Lee |
| 6,913,165 | B2 | * | 7/2005 | Linz et al. ................. 220/568 |
| 2004/0040962 | A1 | * | 3/2004 | Bielecki et al. .......... 220/254.1 |

* cited by examiner

*Primary Examiner*—Robin Hylton
(74) *Attorney, Agent, or Firm*—Gordon K. Anderson

(57) ABSTRACT

A beverage shaker (10) consists of an insulated container (20) which is configured to hold the ingredients for protein supplement drinks. The shaker permits manual mixing by shaking to and fro and retains any large pieces of the remaining ice within the container. The shaker has a removable top member (32) that is attached to the container which includes a smooth peripheral lip (26) surrounding the container suitable for drinking. A strainer (50) is supported internally by the top member and is configured for holding back large sized pieces of ice. A lid (60) internally interfaces with the top member in a leak proof manner permitting protein supplement drink ingredients to be mixed and consumed directly from the shaker when the lid is removed.

15 Claims, 6 Drawing Sheets

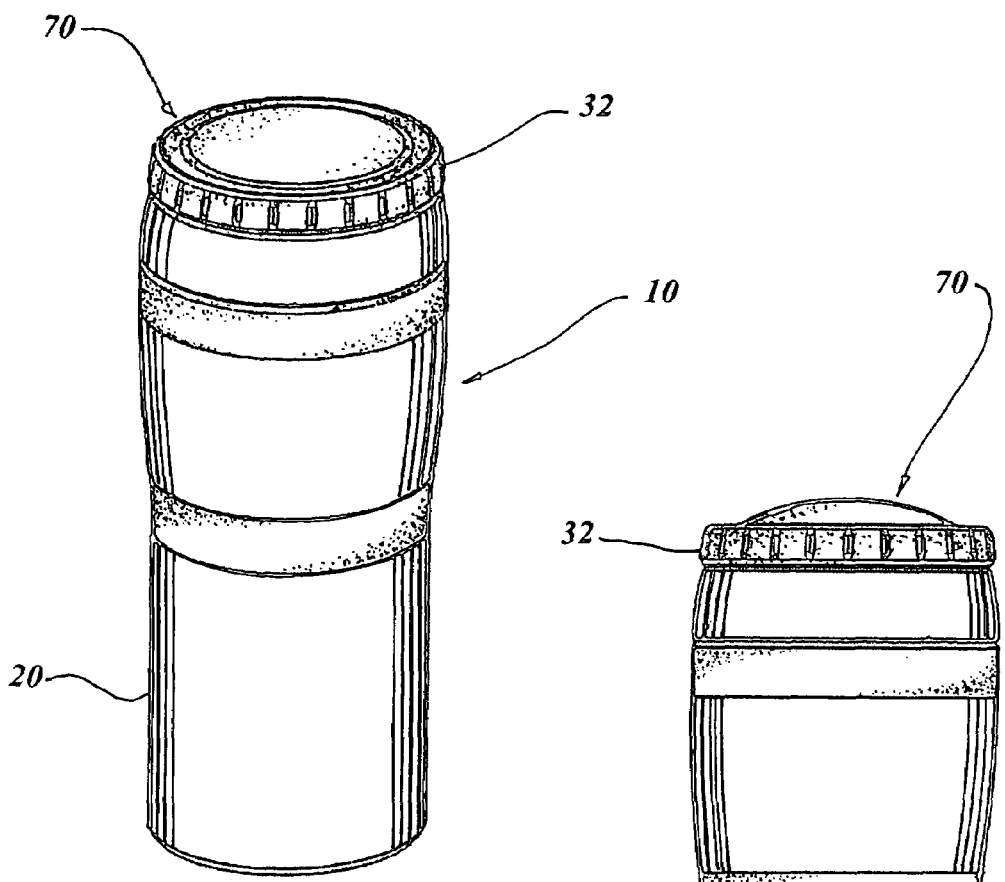
FIG. 1
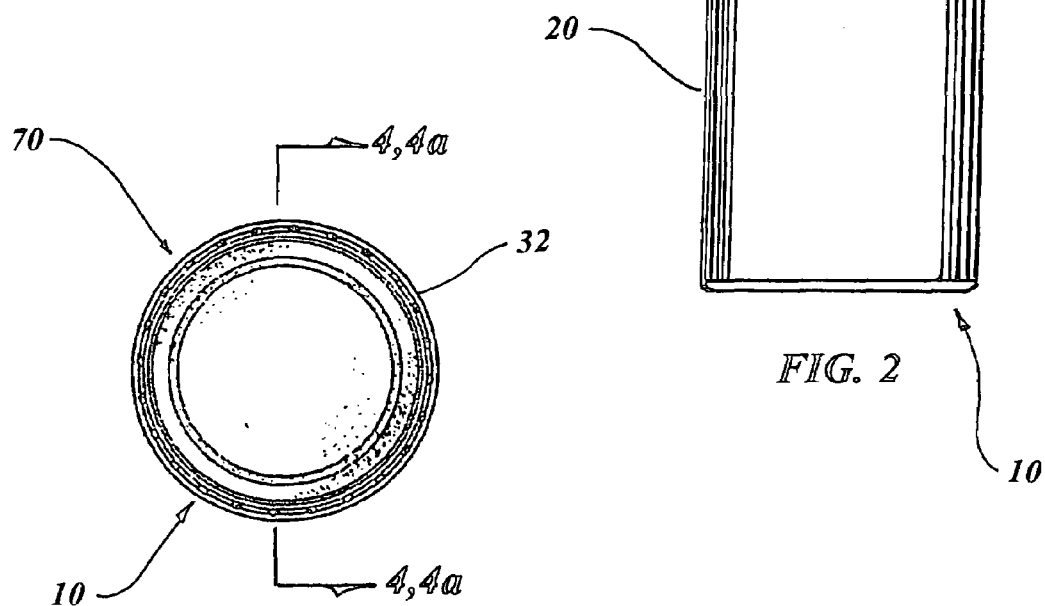
FIG. 2
FIG. 3

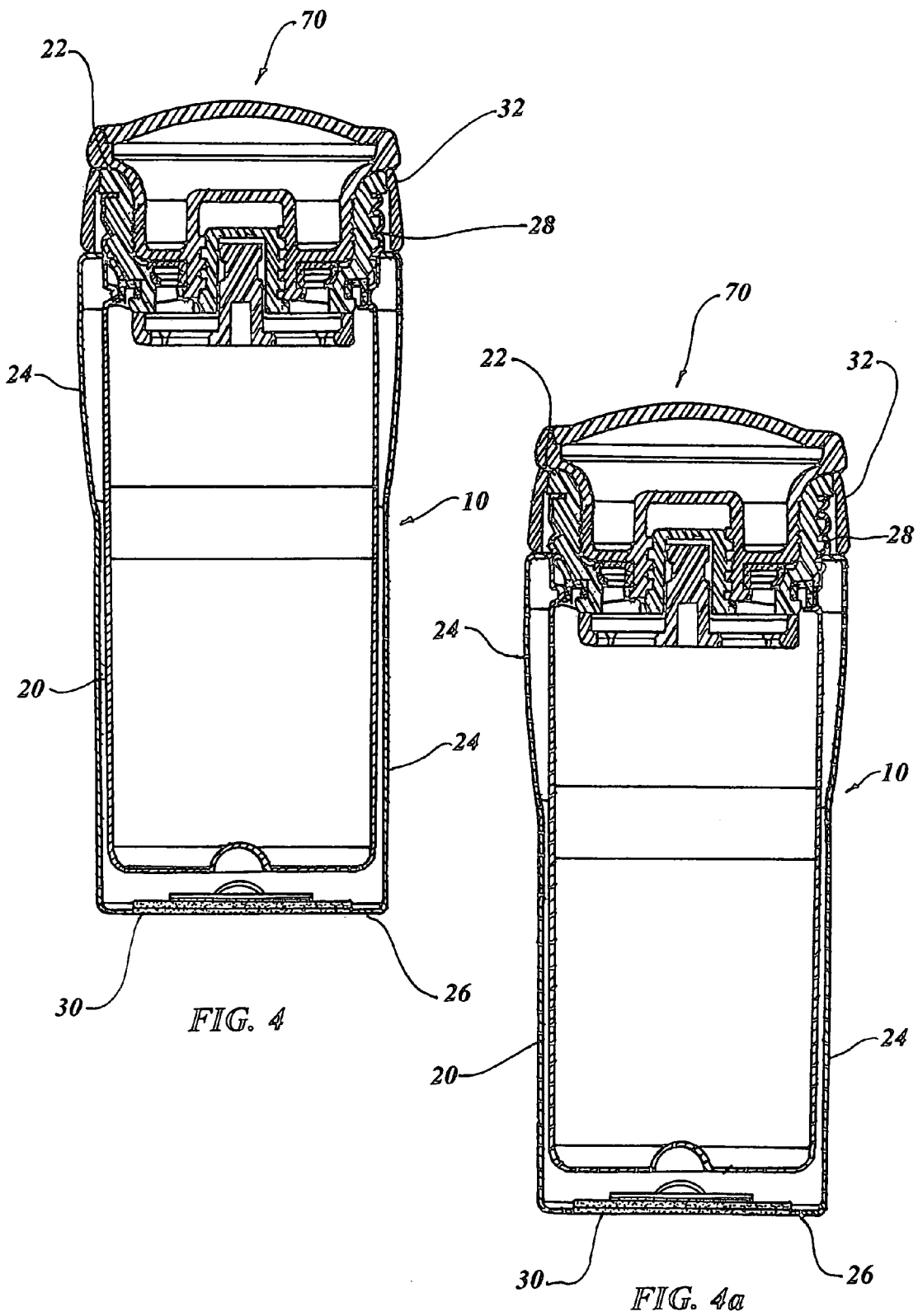

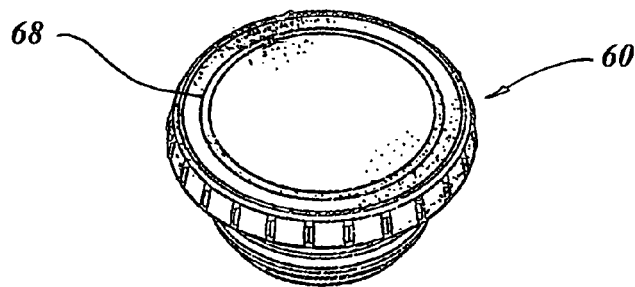
FIG. 15
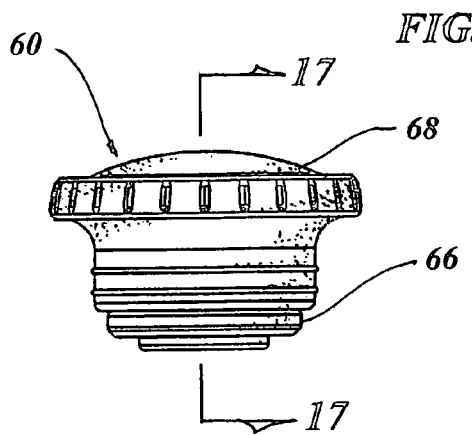
FIG. 16
FIG. 17
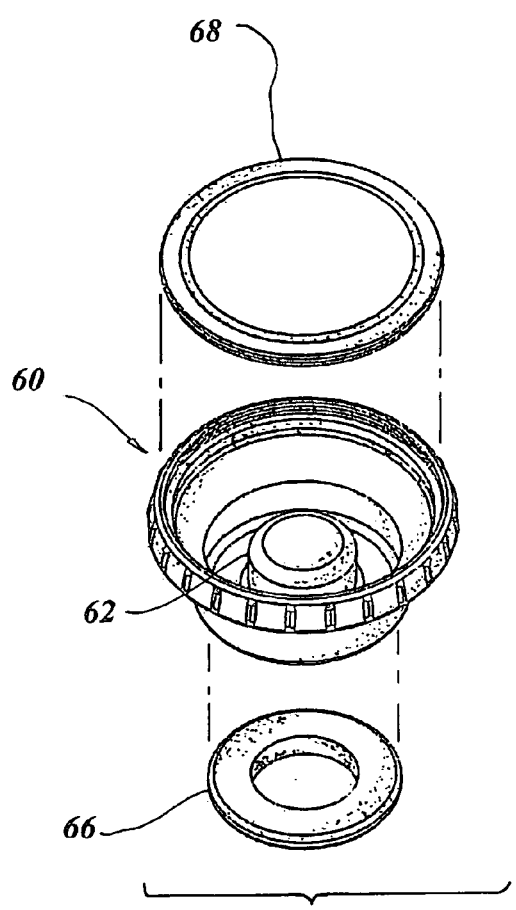
FIG. 19
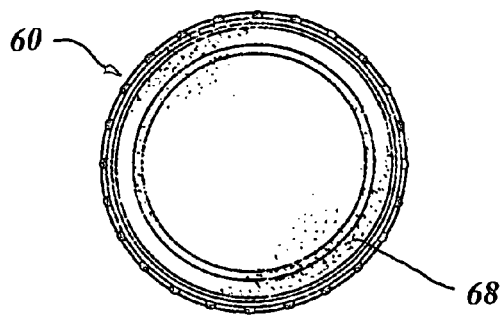
FIG. 18

US 7,571,830 B2

BEVERAGE SHAKER WITH ICE STRAINER

TECHNICAL FIELD

The present invention relates to liquid containers in general. More specifically to a beverage shaker for protein supplement drinks.

BACKGROUND ART

Previously, many types of liquid containers have been used in endeavoring to provide an effective means to retain liquid in a vessel while permitting mixing of dry ingredients into a fluid for creating a variety of consumable beverages.

The prior art listed below did not disclose patents that possess any of the novelty of the instant invention; however the following U.S. patents are considered related:

| U.S. Pat. No. | Inventor | Issue Date |
| --- | --- | --- |
| 4,303,173 | Nergared | Dec. 1, 1981 |
| 4,818,114 | Ghavi | Apr. 4, 1989 |
| 4,872,764 | Mc Clean | Oct. 10, 1989 |
| 5,419,429 | Zimmerman | May 30, 1995 |
| 5,911,504 | Schindlegger, Jr. | Jun. 15, 1999 |
| 6,299,037 | Lee | Oct. 9, 2001 |

Nergared in U.S. Pat. No. 4,303,173 teaches an open top receptacle with a laterally extending handle on one side arranged to receive a cup-shaped cover of a mug type drinking receptacle. The cover includes a valve to prevent spilling with the valve biased against an opening in the cover. Releasing the actuating member permits the supporting arms to close the valve opening.

U.S. Pat. No. 4,818,114 issued to Ghavi is for a device for attachment to a bottle to facilitating mixing of solid food particles into a liquid. The shaker top consists of a circular-dome shaped mixing chamber for attachment to the bottle. A mixing disc having spaced arms radiating from a center post which is shaped to produce a multitude of shear points for increasing a cutting action during the shaking process. The mixing disc accommodates the movement of the liquid and particles into the mixing chamber and back into the bottle.

Mc Clean in U.S. Pat. No. 4,872,764 discloses a beverage processing apparatus consisting of an outer housing forming a vessel for containing a beverage mixture. An upper portion of the vessel contains a motor that drives a shaft having processing blades for mixing a beverage including ice cubes. The blades are inwardly inclined to promote folding in the event of striking an obstacle during processing.

Zimmerman in U.S. Pat. No. 5,419,429 teaches a mixing and drinking beaker with an adhesive closing and sealing system between the cover and the beaker with a chamber in the cover. The adhesive bond between the cover and the beaker can be changed to a positive bond by a shrink strip.

U.S. Pat. No. 5,911,504 issued to Schindlegger, Jr. is for a stirring device for a container which includes a housing having inner threads for mating with the container. A drive shaft for a stirring extends through the housing and batteries supply power to stir liquid within the container.

Lee in U.S. Pat. No. 6,299,037 discloses a press-control bottle stopper that includes a hollow stopper shell fastened to the neck of a bottle. The stopper shell has a bottom hole and a water outlet enabling liquid to pass through. A spring holds the plug in the closed position and a manual control unit moves the plug from an open to a closed position.

DISCLOSURE OF THE INVENTION

Diet supplements were introduced some time ago and have become quite popular particular lately with athletes and those who consume large amounts of energy and are concerned with their diet. Protein powder mixed with other ingredients such as yogurt, juice, fruit, and a host of other eatables along with ice becomes a so called high energy drink or protein supplement beverage. This drink or beverage is mixed together with either an electric blender or by hand in a closed container. When mixed in a blender the beverage must be poured into another container for consumption and when finished both must be cleaned separately. If a closed container is used the problem of dual washing is solved but the ice becomes the difficulty as drinking with ice cubes left in the beverage is inconvenient and if removed the drink soon becomes warm and not as palatable.

It is therefore a primary object of the invention to combine the mixing procedures with the ability to drink directly from the container after the ingredients are thoroughly mixed by shaking. The remaining ice is strained out leaving the large pieces inside for continued cooling and yet permitting small particles to be consumed along with the liquid thereby enhancing its texture while correspondingly improving its flavor.

An important object of the invention is that the shaker is completely liquid tight when the lid is screwed into place as a silicone sealing ring fits tightly and creates a hermetic seal without undue torque on the lid. Further since the lid is secure the entire shaker may be transported without fear of leaking such as when a person is commuting to work the shaker with the beverage inside may be handled without concern of its orientation until the lid is removed.

Another object of the invention is the configuration of the container is compatible with conventional beverage holders in modern vehicles. This object is appreciated since it allows the ability to consume a beverage at ones leisure while driving which is not only popular but well accepted throughout this country.

Still another object of the invention is that it is insulated, preferably with a vacuum between double walls which is one of the best insulators available. This type of insulation permits the beverage to be mixed and maintain its temperature for long periods of time particularly if traveling away from home.

Yet another object of the invention is the shakers attractiveness and durability as the shaker is preferably fabricated of stainless steel with a thermoplastic cap and top member. Stainless steel vessels are extremely popular in today's market as they are not only good-looking but extremely long-lasting and stain resistant. As a further enhancement a resilient pad is secured to the bottom of the shaker permitting it to rest securely on a flat surface without slipping.

A further object of the invention is the ability of the shaker to be easily cleaned as the lid is removed from the top member which is also removable from the stainless steel container. The strainer is also a separate element which is easily removed by simply manually pulling it away from the top member as a resilient o-ring holds them together. The thermoplastic material of the lid, top member and strainer is strong, durable and dishwasher safe.

A final object of the invention is the ease of use, as the protein powder and ingredients are placed in the stainless steel liquid container and the top assembly consisting of the combined top member, strainer and lid is screwed in place. The shaker is manually shaken to and fro until a homogenous mix is completed and the lid is screwed off. The top member has a smooth peripheral lip making it easy to drink directly from the shaker or a straw may be inserted in the openings between the strainer ribs and body member struts when desired.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the shaker in the preferred embodiment.

FIG. 2 is a right view of the shaker in the preferred embodiment.

FIG. 3 is a top view of the shaker in the preferred embodiment.

FIG. 4 is a cross sectional view taken along lines 4-4 of FIG. 3 illustrating the stainless steel insulated container.

FIG. 4a is a cross sectional view taken along lines 4a-4a of FIG. 3 illustrating the thermoplastic insulated container.

FIG. 15 is a partial isometric view of the lid completely removed from the assembly for clarity.

FIG. 16 is a side view of the lid completely removed from the assembly for clarity.

FIG. 17 is a cross sectional view taken along lines 17-17 of FIG. 16.

FIG. 18 is a plan view of the lid completely removed from the assembly for clarity.

FIG. 19 is an exploded view of the lid completely removed from the assembly for clarity.

BEST MODE FOR CARRYING OUT THE INVENTION

Figure 2A:
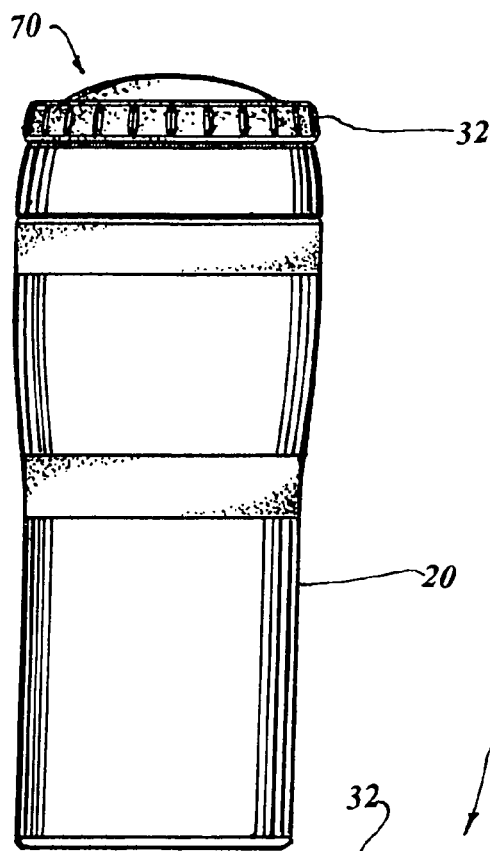
FIG. 2A is a left view of the shaker in the preferred embodiment.
Figure 2B:
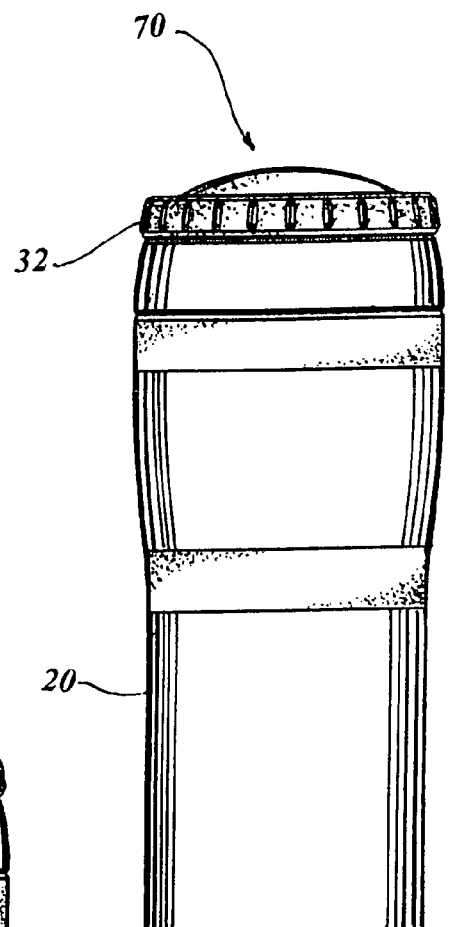
FIG. 2B is a front view of the shaker in the preferred embodiment.
Figure 2C:
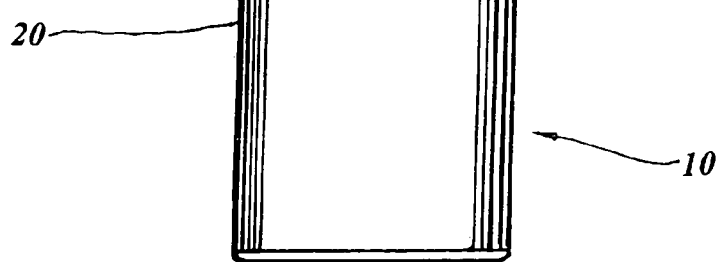
FIG. 2C is a rear view of the shaker in the preferred embodiment.
Figure 5:
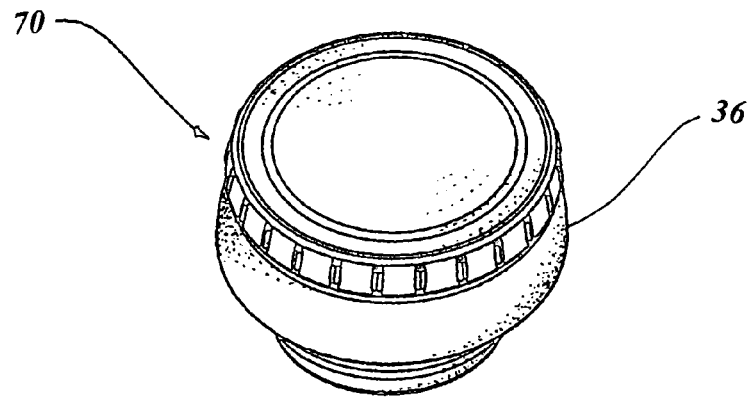
FIG. 5 is a partial isometric view of the top assembly completely removed from the shaker in the preferred embodiment for clarity.
Figure 6:
FIG. 6 is a side view of the top assembly completely removed from the shaker in the preferred embodiment for clarity.
Figure 7:
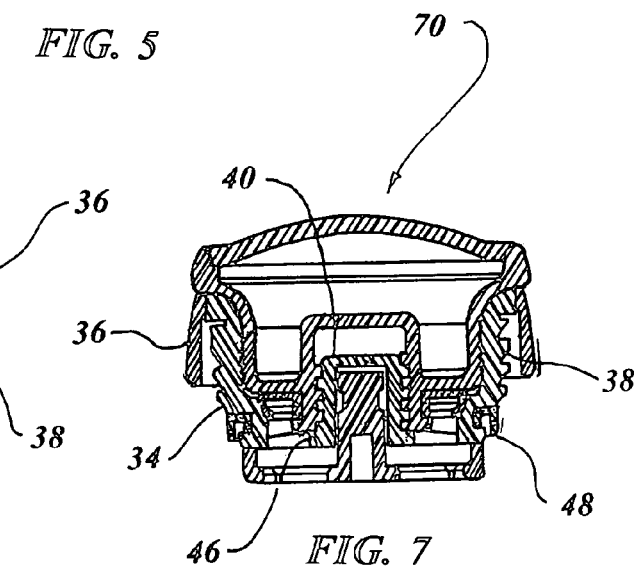
FIG. 7 is a cross sectional view taken along lines 7-7 of FIG. 6.
Figure 8:
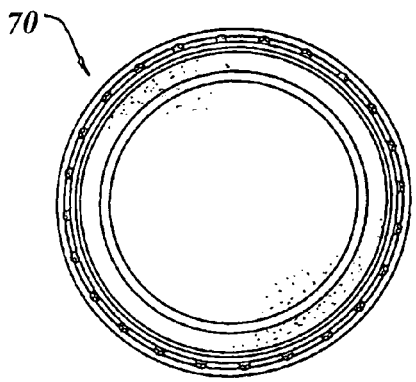
FIG. 8 is a plan view of the top assembly completely removed from the shaker in the preferred embodiment for clarity.
Figure 9:
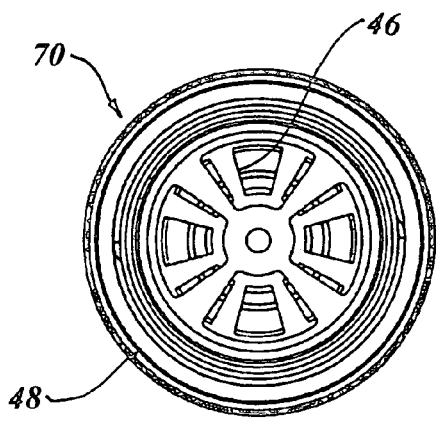
FIG. 9 is a bottom view of the top assembly completely removed from the shaker in the preferred embodiment for clarity.
Figure 10:
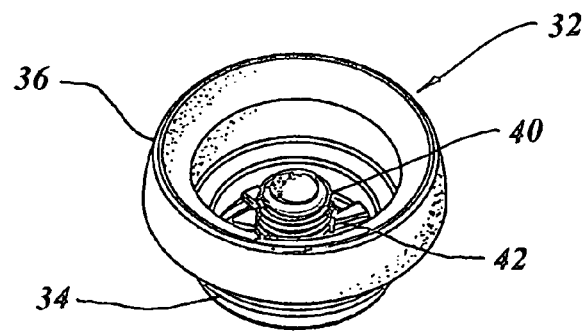
FIG. 10 is a partial isometric view of the top member completely removed from the assembly for clarity.
Figure 11:
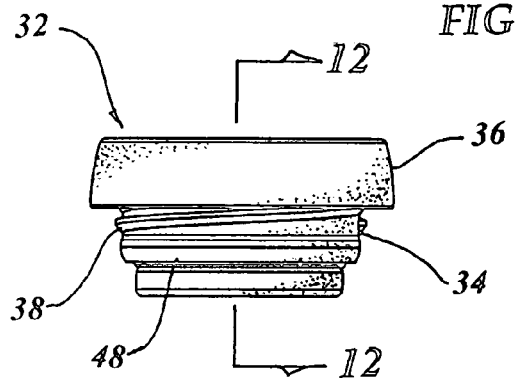
FIG. 11 is a side view of the top member completely removed from the assembly for clarity.

The best mode for carrying out the invention is presented in terms of a preferred embodiment of the protein supplement beverage shaker 10. This preferred embodiment is shown in FIGS. 1 thorough 19 and is comprised of an insulated container 20 having an open top 22, sides 24 and a closed bottom 26, cylindrically shaped and capable of holding liquids within. The container 20, depicted best in FIGS. 1-4, includes a plurality of female threads 28 on the sides 24 adjacent to the open top 22. The insulated container 20 preferably has a double wall construction for insulation purposes, as illustrated in FIG. 4.

The preferred insulation is evacuating the area between the double walls forming a vacuum therebetween which minimizes thermal feed-through from the surrounding ambient to the contents within the shaker 10. The double wall, in a stainless steel construction, is ideal however thermoplastic construction, as illustrated in FIG. 4a, is also a viable alternative. While vacuum insulation is preferred with double wall construction, the container 20 may also be formed with a double wall and a dead air space for insulation or a single wall will function with either material and perform the basic function properly. A resilient pad 30 may be attached to the bottom 26 to prevent slipping when the container is resting on a flat surface.

A removable top member 32 is attached to the container 20 as illustrated in FIGS. 1-4 and 4a. The top member 32 includes a body member 34 that is shown by itself in FIGS. 10-14. The top member 32 also has a contoured, uninterrupted, smooth peripheral lip 36 that surrounds the body member 34 and is configured to make it suitable for drinking therefrom. The body member 34 further includes a plurality of male threads 38 that interface with the container female threads 28 permitting retention and removal of the top member 32. The removable top member 32 is preferably of a thermoplastic construction consisting of acrylic, allyl diglycol carbonate, polycarbonate, polystyrene, polysulfone, polyester sulfone or polyester and the like.

Figure 12:
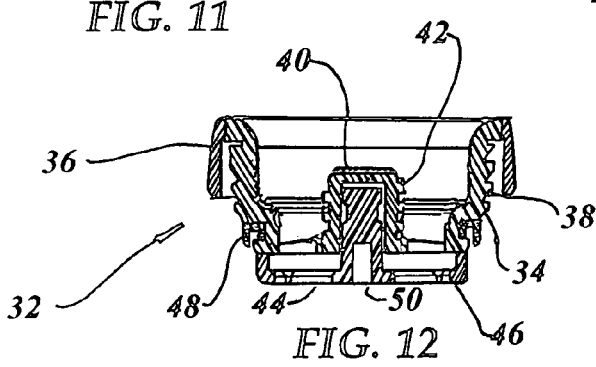
FIG. 12 is a cross sectional view taken along lines 12-12 of FIG. 11.

The removable top member 32 is formed with a centrally located upright cap 40 that is supported internally, with the cap 40 used for attachment of a lid, described later. The cap 40 includes a plurality of cap male threads 42 that are formed on an outside surface as shown best in FIGS. 12 and 14, and a smooth bore 44 on an inside surface as illustrated in FIG. 12. A plurality of struts 46 connects the upright cap 40 to the body member 34 permitting liquid to pass through unobstructed. The struts are depicted best in FIGS. 12-14 and are integrally formed with the body member 34.

Figure 14:
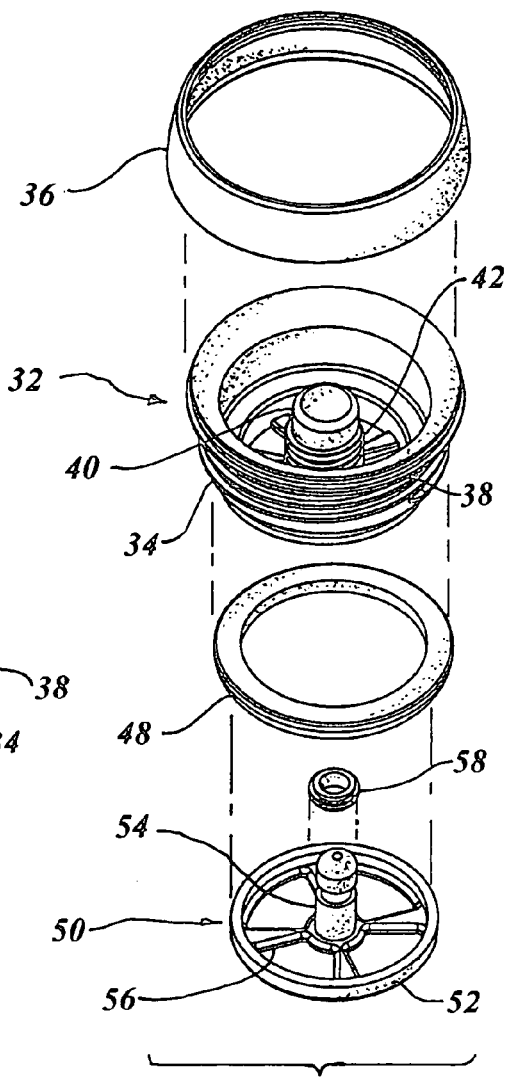
FIG. 14 is an exploded view of the top member completely removed from the assembly for clarity.

A sealing ring 48, shown best in FIGS. 12 and 14, is preferably made of silicone and is positioned beneath the male threads 38 for hermetically sealing the top member 32 to the container 20.

Figure 13:
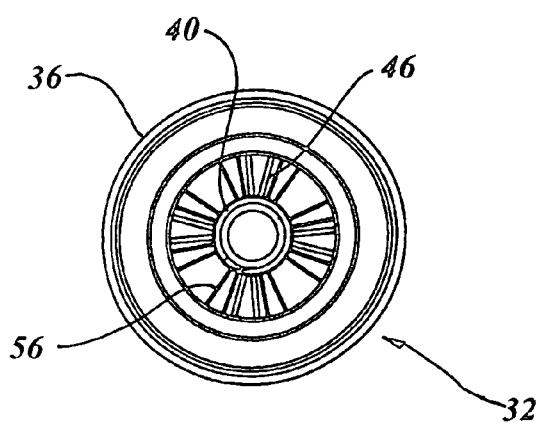
FIG. 13 is a plan view of the top member completely removed from the assembly for clarity.

A removable strainer 50 is supported internally by the upright cap 40 of the body member 34 and is centrally positioned within the body member 34 as shown in FIG. 13. The strainer 50 is configured to hold back predetermined sized pieces of ice after mixing by shaking has taken place within the container 20. The strainer 50 is formed with an outer ring 52 and an inner upstanding column 54 with a plurality of integral ribs 56 attaching the outer ring 52 to the upstanding column 54. The ribs 56 are spaced apart sufficiently to permit the flow of liquid but obstruct predetermined sized pieces of ice from leaving the container 20.

A strainer o-ring 58 is disposed around the column 54 permitting the strainer 50 to be removably retained by the compression of the o-ring 58 between the smooth bore 44 of the upright cap 40 and a groove in the outside diameter of the column 54 when the column is positioned therein. The ability to remove the strainer 50 is advantageous as it may be cleaned separately and replaced easily by manually reinserting the column 54 into the bore 44. FIG. 14 illustrates the strainer 50 and o-ring 58 alone in the exploded view.

A sealable lid 60, illustrated in FIGS. 15-19, internally interfacing with the body member 34 in a leak proof manner, thereby permitting protein supplement drink ingredients to be mixed by manually shaking the invention while retaining the remaining ice within the container 20 when the supplement drink is consumed by the user. The lid 60 consists of a cylindrical cover 62 that is configured to fit over and interface with the body member upright cap 40. The cover has internal threads 64 that mate with the cap male threads 42 on the upright cap 40 permitting the lid 60 to be removed from the top member 32 by manual rotation of the lid 60. In order to seal the lid 60 against the body member 34 a compressible seal 66 is disposed around the cylindrical cover 62 compressing the seal therebetween. A dome shaped cap 68 is sealed in place onto an upper peripheral edge of the lid 60 as shown in FIG. 19 completing the lid 60.

The removable strainer 50 and the lid 60 are preferably formed of thermoplastic such as acrylic, allyl diglycol carbonate, polycarbonate, polystyrene, polysulfone, polyester sulfone and polyester or the like.

The combination of the removable top member 32, strainer 50 and lid 60 are illustrated as a top assembly 70 in FIGS. 5-9 and as such are removable in concert from the container 20 for cleaning. The discrete elements of the assembly 70 may then be dissembled and cleaned separately.

In use the top assembly 70 is removed and the ingredients for making protein powder supplement beverage which includes ice, in most cases, are poured into the container 20 and the assembly 70 is replaced by screwing onto the threads 28 and 38. The shaker 10 is then manually shook to and fro until the mix is completed which often breaks apart some of the ice when cubes or chunks are primarily used. The user may then remove the lid 60 and drink directly from the shaker 10 or optionally use a straw or pour the beverage in another container. In any case the large pieces of ice left in the shaker 10 are strained out and remain inside prolonging the cooling effect and for later disposal.

While the beverage shaker 10 is primarily conceived as a blender for mixing protein powder supplement beverage with other ingredients, it is not limited to that utility as a myriad of other uses for mixing solids, powders and liquids where ice is involved is envisioned While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

PROTEIN SUPPLEMENT BEVERAGE SHAKER

| Element Designation | |
|---|---|
| 10 | beverage shaker |
| 20 | insulated container |
| 22 | open top (of 20) |
| 24 | sides (of 20) |
| 26 | closed bottom (of 20) |
| 28 | female threads (on 20) |
| 30 | resilient pad |
| 32 | top member |
| 34 | body member (of 32) |

-continued

| Element Designation | |
|---|---|
| 36 | lip (of 34) |
| 38 | male threads (on 34) |
| 40 | upright cap |
| 42 | cap male threads |
| 44 | smooth bore |
| 46 | struts |
| 48 | sealing ring |
| 50 | strainer |
| 52 | outer ring (of 50) |
| 54 | inner upstanding column (of 50) |
| 56 | ribs (of 50) |
| 58 | strainer o-ring |
| 60 | lid |
| 62 | cylindrical cover |
| 64 | internal threads (on 62) |
| 66 | compressible seal |
| 68 | dome shaped cap |
| 70 | top assembly |

The invention claimed is:

1. A beverage shaker for protein supplement drinks which comprises:

an insulated container having an open top, sides and a closed bottom configured to hold a liquid therein, a top member removable from the container, said top member having;

an integral body member having body member male threads, an integral smooth peripheral lip surrounding the body member with the lip suitable for drinking, an integral sealing ring positioned beneath said body member male threads for hermetically sealing the top member to the container, an integral centrally located upright cap supported internally, for attachment of a lid, an integral plurality of cap male threads on an outside surface and a smooth bore on an inside surface, an integral plurality of struts connecting said upright cap to the body member of said top member permitting liquid to pass through unobstructed, a strainer removable for cleaning, centrally positioned within the top member supported by said upright cap, configured for holding back unwanted pieces of ice, and a lid attached to the container top member for enclosing the container when shaking and for retention of the drinks contained therein.

2. A beverage shaker for protein supplement drinks which comprises:

an insulated container having an open top, sides and a closed bottom cylindrically configured to hold a liquid therein, with the container having a plurality of female threads on the sides adjacent to the open top, a removable top member attached to said container, the top member having a body member and a contoured, uninterrupted, smooth peripheral lip surrounding the body member suitable for drinking, wherein said body member further having a plurality of male threads for interfacing with said container female threads for top retention and removal, an integral sealing ring positioned beneath said body member male threads for hermetically sealing the top member to the container, said removable top member integrally having;

a) a centrally located upright cap supported internally, for attachment of a lid, b) said cap having a plurality of cap male threads on an outside surface and a smooth bore on an inside surface, and c) said cap having a plurality of struts connecting said upright cap to said body member permitting liquid to pass through unobstructed, a removable strainer supported internally by said cap of said body member, centrally positioned within the body member and configured for holding back predetermined sized pieces of ice, and a sealable lid internally interfacing with said body member in a leak proof manner permitting protein supplement drink ingredients to be mixed by manually shaking and retaining remaining ice within the container when previously mixed supplement drink is consumed.

3. A beverage shaker for protein supplement drinks which comprises:

a liquid container having an open top, sides and a closed bottom to configured to hold a liquid therein, a body member having body member male threads, a top member connected to said container, said top member having an integral lip surrounding the body member suitable for drinking, a sealing ring positioned beneath said top member male threads for hermetically sealing the top member to the container, a strainer disposed within the top member permitting drink ingredients to be mixed by manually shaking with ice to be retained within container, a lid attached to the container top member for enclosing the container while shaking and for retention of drinks contained therein, a centrally located upright cap supported internally, for attachment of said lid, also said cap having a plurality of cap male threads on an outside surface and a smooth bore on an inside surface, and said centrally located upright cap further comprises a plurality of struts connecting said upright cap to said body member permitting liquid to pass through unobstructed.

4. The beverage shaker as recited in claim 3 wherein said container further comprises a double wall construction for insulation purposes.

5. The beverage shaker as recited in claim 4 wherein said container further comprises a vacuum insulation between the double walls minimizing thermal feed-through from the surrounding ambient to the contents within the shaker.

6. The beverage shaker as recited in claim 3 wherein said container further comprises a stainless steel construction.

7. The beverage shaker as recited in claim 3 wherein said container further comprises a thermoplastic construction.

8. The beverage shaker as recited in claim 3 wherein said container further comprises a resilient pad attached to the bottom to prevent slipping when the container is resting on a flat surface.

9. The beverage shaker as recited in claim 3 wherein said removable top member further comprises a thermoplastic construction wherein, said thermoplastic is selected from the group consisting of acrylic, allyl diglycol carbonate, polycarbonate, polystyrene, polysulfone, polyester sulfone and polyester.

10. The beverage shaker as recited in claim 3 wherein said sealing ring further comprises a silicone construction.

11. The beverage shaker as recited in claim 3 wherein said strainer further comprises a an outer ring and an inner upstanding column with a plurality of integral ribs attaching the outer ring to the upstanding column with the ribs spaced apart sufficiently to permit the flow of liquid but obstruct predetermined sized pieces of ice from leaving the container.

12. The beverage shaker as recited in claim 11 wherein said upstanding column further comprises a strainer o-ring disposed around the column such that the strainer is removably retained by compression of the o-ring when the column is positioned within the smooth bore of the top upright cap.

13. The beverage shaker as recited in claim 3 wherein said lid further comprises a cylindrical cover configured to fit over and interface with said top upright cap, said cover having a plurality of internal threads that mate with the cap male threads on the top upright cap permitting the lid to be removed from the top member by manual rotation of the lid.

14. The beverage shaker as recited in claim 13 wherein said lid further comprises a compressible seal disposed around the cylindrical cover compressing the seal between the lid and the top member.

15. The beverage shaker as recited in claim 3 wherein said strainer and said lid further comprises a thermoplastic construction, wherein said thermoplastic is selected from the group consisting of acrylic, allyl diglycol carbonate, polycarbonate, polystyrene, polysulfone, polyester sulfone and polyester.

* * * * *